United States Patent [19]

Caldwell

[11] Patent Number: 5,206,189
[45] Date of Patent: Apr. 27, 1993

[54] SOL-GEL METHOD FOR THE PREPARATION OF MONOLITHIC MULTICOMPONENT OXIDE GLASSES

[75] Inventor: J. Brian Caldwell, Highland Park, N.J.

[73] Assignees: Instituto Guido Donegani S.p.A., Novara; Enichem S.p.A., Milan, both of Italy

[21] Appl. No.: 782,830

[22] Filed: Oct. 25, 1991

[51] Int. Cl.$^5$ .................. C03C 3/00; C03C 3/076; C03C 3/095

[52] U.S. Cl. ........................ 501/12; 501/55; 501/60; 501/62; 501/64; 501/68; 501/900; 423/332; 423/338; 423/339

[58] Field of Search ............. 501/12, 54, 55, 65, 501/66, 67, 68, 60, 62, 64, 900; 65/17, 18.3, 30.13; 423/332, 338, 339

[56] References Cited

U.S. PATENT DOCUMENTS

| | | | |
|---|---|---|---|
| 4,278,632 | 7/1981 | Yoldas | 264/66 |
| 4,397,666 | 8/1983 | Mishima et al. | 65/18.3 |
| 4,686,195 | 8/1987 | Yamane | 501/12 |
| 4,767,433 | 8/1988 | Iura et al. | 65/21.1 |
| 4,797,376 | 1/1989 | Caldwell et al. | 501/12 |
| 4,801,399 | 1/1989 | Clark et al. | 252/315.01 |
| 4,816,072 | 3/1989 | Harley et al. | 106/287.18 |
| 4,902,650 | 2/1990 | Caldwell et al. | 501/12 |
| 5,068,208 | 11/1991 | Haun et al. | 501/12 |
| 5,069,700 | 12/1991 | Yamane et al. | 65/17 |

OTHER PUBLICATIONS

Journal of Non-Crystalline Solids, vol. 121, 1990, pp. 61-65, H. Maeda, et al., "Reduction of Lead Migration During Drying of a Gel".

Journal of Non-Crystalline Solids, vol. 99, 1988, pp. 160-167, M. Yamane, et al., "Preparation of Pb-Containing Glass by the Sol-Gel Process".

*Primary Examiner*—Mark L. Bell
*Assistant Examiner*—Michael A. Marcheschi
*Attorney, Agent, or Firm*—Oblon, Spivak, McClelland, Maier & Neustadt

[57] ABSTRACT

An improved method for the production of a monolithic multicomponent oxide glass is achieved by forming an oxide host gel by a sol-gel process, placing the host gel in an aqueous solution of a salt of at least one metal selected from the group consisting of Li, Na, K, Rb, Cs, Sc, Y, La, Ce, Pr, Nd, Sm, Eu, Gd, Tb, Dy, Ho, Er, Tm, Yb, Lu and Pb, precipitating the metal salt in the gel and sintering the gel containing the precipitated salt. The method can incorporate large amounts of metals into the glass which are otherwise difficult or impossible to incorporate into precursor gels by conventional methods.

27 Claims, No Drawings

SOL-GEL METHOD FOR THE PREPARATION OF MONOLITHIC MULTICOMPONENT OXIDE GLASSES

BACKGROUND OF THE INVENTION

1. Field of the Invention

The present invention relates to an improved sol-gel method for the preparation of multicomponent monolithic oxide glasses having high concentration of non-$SiO_2$ components.

2. Discussion of the Background

The conventional methods of preparing multicomponent silicate glasses involve mixing solid precursor powders, followed by melting the mixture of powders. However, the use of solid-phase materials limits the homogenity achievable in the mixture of powders, which in turn, limits the homogeneity of glasses produced therefrom. Furthermore, the conventional solid precursor powders used in the preparation of multicomponent monolithic oxide glasses are generally metal oxides, which are very difficult to purify, and which have dangerously high melting temperatures. Furthermore, the molten metal oxide precursor powders often separate into different phases, resulting in a further reduction in the homogeneity of the glasses produced by conventional melting methods.

Recently, significant interest has developed in producing modified silica gel which contains at least one metal other than silicon. A method using a mixed solution of a silicon alkoxide and at least one additional metal alkoxide has been suggested for the production of such modified silica glass (Kimiya et al, "Proceeding of the Tenth International Congress on Glass," Kyoto, Japan (July 1974), Part II, pages 13–44 to 13–48).

Many applications in optics and in other fields require glasses with a high refractive index. In order to achieve a high refractive index, it is desirable to incorporate elements such as lead or the rare earths into the glass. However, these elements are difficult to use in the mixed alkoxide method because their corresponding alkoxides are either unstable or only sparingly soluble in the solvents conventionally employed.

Other glass components which raise the refractive index, such as titanium, zirconium or niobium, are convenient to use in the mixed alkoxide method. One example is the mixed alkoxide method of U.S. Pat. No. 4,278,632 (incorporated herein by reference), used to produce silica-titania glasses. However, in order to achieve high concentrations of these elements while simultaneously avoiding devitrification, it is necessary to include relatively large amounts of alkaline elements, such as potassium or sodium. Unfortunately, when alkaline elements are used in the mixed alkoxide method, the resulting precursor gel is often very fragile and prone to fracture.

SUMMARY OF THE INVENTION

The problems and limitations of the mixed powder method and the mixed alkoxide method are now overcome, according to the present invention, by the use of a sol-gel technique employing a salt precipitation step, in order to incorporate large amounts of lead, rare earth elements and/or other metals in the gel.

Accordingly, one object of the present invention is to provide a method for the preparation of multicomponent monolithic oxide glasses having a high concentration of non-silica components.

A further object of the present invention is to provide a method by which lead and/or rare earth elements can be incorporated into multicomponent monolithic oxide glasses.

A further object of the present invention is to provide a method for the preparation of multicomponent monolithic oxide glasses which exhibit improved homogeneity.

A further object of the present invention is to provide a method for the preparation of highly refractive glasses.

A further object of the present invention is to provide a method for the preparation of monolithic multicomponent oxide glasses employing lower temperatures than those used in traditional melting methods.

A further object of the present invention is to provide a glass produced by such a process.

These and other objects which will become apparent during the following detailed description of the present invention have been achieved by a method for the preparation of a monolithic multicomponent oxide glass, comprising the steps of (I) gelling a mixture of a silicon alkoxide, an alcohol, amounts of water and acid sufficient to partially hydrolyze the silicon alkoxide, and optionally, at least one alkoxide of a metal selected from the group consisting of Ti, Zr, Hf, Nb, Ta, B, Al, Ga, Ge, Sn, Sb and mixtures thereof, (II) incorporating into the gelled mixture at least one salt of at least one metal selected from the group consisting of Li, Na, K, Rb, Cs, Sc, Y, La, Ce, Pr, Nd, Sm, Eu, Gd, Tb, Dy, Ho, Er, Tm, Yb, Lu, Pb and mixtures thereof, (III) precipitating the metal salt(s) incorporated into the gelled mixtures, and (IV) sintering the gelled mixture into which the metal salts have been precipitated.

DETAILED DESCRIPTION OF THE PREFERRED EMBODIMENTS

Briefly described, the present invention provides an improved sol-gel technique for making multicomponent high index glasses, in which a precipitation step is used to incorporate metal salt dopants into a relatively sturdy host gel, preferably derived from metal alkoxide precursors. The present invention makes it possible to manufacture fully dense, transparent glasses having a high concentration of non-silica (non-$SiO_2$) components and a high refractive index. The present invention also provides a method by which the index of refraction of a glass can be controlled. The glass produced by the present method can have an index of refraction of from about 1.5 to about 2.0, depending on the desired refractive properties.

The present method provides a number of advantages. For example, the present method leads to more homogeneous glasses, because the precursor materials are in the liquid phase, enhancing blendability of the present precursor materials over conventional solid powders. Thus, homogeneous multicomponent silicate glasses are obtained, since the starting materials are intimately mixed at the molecular level. Furthermore, the present method allows the preparation of purer glassy products, because the starting materials used in the present process can be purified by conventional purifying techniques, such as distillation and recrystallization.

The present sol-gel method provides the further advantage that glasses of new compositions which would suffer from phase separation during melting and cooling are now obtainable as homogeneous single phases. Also, since the present method does not require a melting step, the present method allows the formation of glasses at relatively low temperature, which leads to cost savings and significantly reduced hazards in handling the materials.

The invention appears to be particularly suitable for introducing lanthanide dopants into silica gel in a manner which allows rapid drying and sintering of the gel. Materials made by the present method find use, for example, in optical elements or lasers.

The present invention offers greater flexibility and ease of processing since the host gel can be prepared without special consideration for the doping materials. For example, a large number of host gels can be prepared at one time from a single formulation, and each host gel may be doped with a different metal salt or mixture of metal salts, as desired.

Another advantage is that large quantities of dopants may be incorporated into the final glass. This is because the host gel has a very large porosity, typically greater than 90 percent. Also, since the host gel is chosen primarily for its robustness, the processing steps are easier. For example, drying times are considerably shortened. Preferably, the doped gel is dried for a period of time of less than one week, particularly preferably one day or less. A particular example is 12.5 mm diameter doped gels in the $Er_2O_3$-$Na_2O$-$TiO_2$-$Al_2O_3$-$SiO_2$ system, which have been successfully dried by conventional means in less than four hours, a drying speed almost unheard of in the sol-gel literature, where drying times are usually measured in weeks or even months.

The present method can be advantageously carried out according to the following procedure. An alkoxide of silicon, diluted with an alcohol, is partially hydrolyzed by adding a small amount of slightly acidic water at a temperature ranging from 5° to 30° C., preferably from 15° to 30° C., particularly preferably about room temperature (20°-27° C.). The resulting solution is then stirred for a length of time sufficient to effect the partial hydrolysis, preferably from 5 to 20 minutes. If necessary the partially hydrolyzed mixture is then chilled to a temperature of near 0°.

Tetramethoxysilane (TMOS) is the particularly preferred source of silica in the gel, although other silicon alkoxides, such as silicon tetraethoxide, silicon tetrapropoxide, silicon tetraisopropoxide and mixtures thereof, are also suitable, as long as the resulting gel is sufficiently strong to withstand subsequent processing steps.

The alcohol used for diluting the silicon alkoxide is not limited to any particular alcohol or group of alcohols. Suitably, any alcohol can be used which provides a sufficiently strong gel. Preferred alcohols are the lower alcohols, such as methanol, ethanol, propanol, butanol, pentanol, hexanol, structural isomers thereof, and mixtures thereof. Methanol is particularly preferred. The alcohol is present in an amount such that the molar ratio of the alcohol to the silicon alkoxide is from 4:1 to 20:1, preferably 6:1 to 15:1, and particularly preferably from about 8:1 to about 12:1. The alcohol can also be accompanied by one or more additional organic solvents, such as N,N-dimethylformamide. The additional organic solvent can be present in an amount such that the volume ratio of the additional organic solvent to the alcohol is up to 2:1, preferably up to about 1:1, and particularly preferably is about 1:1.

The amount of water used to partially hydrolyze the silicon alkoxide is sufficient to result in a molar ratio of water to silicon alkoxide of from 0.5:1 to 5:1, preferably from 1:1 to 4:1. The catalytic acid is not absolutely necessary for gelation, but its presence advantageously enhances the rate of hydrolysis. Suitable catalytic acids include the mineral acids, such as hydrochloric acid, nitric acid, sulfuric acid and phosphoric acid, and include organic acids, such as formic acid, acetic acid, haloacetic acids (for example, chloroacetic acid, trifluoroacetic acid and trichloroacetic acid) and oxalic acid. The catalytic acid can be used in an amount of from 0.1 to 100 mmol of acid per mole of silicon alkoxide. Preferably, the amount of acid is from 1 to 10 mmol per mole of silicon alkoxide.

The amount of $SiO_2$ precursors in the gel should be from 40 to 100 mole percent, preferably between 50 and 99 mole percent, particularly preferably from 60 to 90 mole percent, such that the amount of silica in the final glass is from 30 to 98 mole percent. Amounts of silica precursors less than 40 mol % result in the gel being too weak to withstand the processing steps.

Optionally, one or more metal alkoxides of Ti, Al, Zr, Hf, Nb, Ta, B, Ga, Ge, Sn and Sb, preferably Ti and/or Al, are added to the mixture, preferably after the partial hydrolysis of the silicon alkoxide(s). The preferred metal alkoxides are the lower alkoxides, such as methoxide, ethoxide, propoxide, isopropoxide, n-butoxide, isobutoxide, sec-butoxide and t-butoxide. These optional metal alkoxides are present in the gel in an amount of from 0 to 50 mole percent, preferably between 1 and 50 mole percent, particularly preferably from 10 to 40 mole percent.

The preferred sources of $TiO_2$ are the lower alkoxides of titanium, such as titanium tetraethoxide, titanium tetrapropoxide, titanium tetraisopropoxide and titanium tetrabutoxide. The particularly preferred source of $TiO_2$ is titanium tetraisopropoxide. Sources of $Al_2O_3$ can be selected from lower alkoxides of aluminum, such as aluminum methoxide, aluminum ethoxide, aluminum propoxide, aluminum isopropoxide, aluminum sec-butoxide, aluminum tert-butoxide, and aluminum alkoxide chelates, such as aluminum di(sec-butoxide) acetoacetic ester and aluminum diisopropoxide acetoacetate ester chelate (sold by Alfa Products, Danvers, Mass., and Chattem Chemicals, Chattanooga, Tenn.), and mixtures thereof. The particularly preferred source of $Al_2O_3$ is aluminum di(sec-butoxide) acetoacetic esters chelate.

The metal oxides of the gel and the final glass product (for example, $SiO_2$, $TiO_2$ and $Al_2O_3$) are formed from their corresponding metal alkoxide precursors by hydrolysis and polycondensation reactions. These reactions lead to the formation of a highly porous oxide gel.

To facilitate and complete the gelation, a second portion of water is added to the alkoxide solution. A sufficient amount of the second portion of water is added to the partially hydrolyzed alkoxide mixture to result in a gel sufficiently strong to withstand subsequent processing steps. The molar ratio of the second portion of water to the total moles of silicon alkoxides and, if present, metal alkoxides is from 0:1 to 19.5:1, preferably from 1:1 to 10:1, particularly preferably from 2:1 to 5:1, such that the total amount of the water used to partially hydrolyze the silicon alkoxide and the second portion of water results in a molar ratio in the final gel of from 2:1 to 20:1 with respect to the molar amount of silicon alkoxides and metal alkoxides. Preferably, the ratio of total water to total alkoxides is from 3.5:1 to 10:1, and is particularly preferably about 5:1.

Prior to gelation, the solution is preferably poured into a mold of a desired shape. After the solution gels, it is advantageously allowed to age at a temperature between 20° and 100° C., preferably at a temperature between 20° and 80° C., for a period of time between 10 minutes and several weeks, preferably for a period of time of from one hour to two days. Particularly preferably, aging is conducted in two stages, a first stage at ambient temperatures (20°-27° C.), and a second stage at a temperature of 50°-70° C., each stage lasting for a period of time of from 8 to 36 hours.

The gel is then transferred to a solution, preferably an aqueous solution, for incorporation of a dopant into the gel. The dopant can include, but is not limited to, one or more high refractive index modifier(s). Preferred metal salts to be used as the dopant(s) and/or high refraction index modifiers are the acetates and other carboxylates of Li, Na, K, Rb, Cs, Sc, Y, La, Ce, Pr, Nd, Sm, Eu, Gd, Tb, Dy, Ho, Er, Tm, Yb, Lu and Pb, though other salts, such as oxalates, carbonates, and in certain cases, nitrates, may also be used. Other carboxylates include propionates, butyrates, isobutyrates, benzoates, haloacetates (such as mono-, di- and trichloroacetates and mono-, di- and trifluoroacetates), and the like.

The concentration of the metal salt solution correlates with the amount of dopant to be incorporated into the gel. An appropriate concentration for the metal salt solution is determined by (1) the amount (concentration or percentage) of dopant desired in the final glass and (2) the amount of solvent needed in the dopant bath to result in the desired dopant concentration. Suitable concentrations of the metal salt solution are from 0.001M up to the concentration at which the metal salt solution is saturated, but is preferably from about 0.01M to 1.25M, particularly preferably from 0.1M to about 1.0M. A particularly suitable concentration of lanthanide metal salt is 0.2M.

It is also preferable to include alkali metal salts in the metal salt solution used for doping the gel, particularly preferably the acetates of sodium and potassium. Although acetates are the preferred salts, other salts which can be converted to oxides during sintering can also be used, such as oxalates, carbonates, and in certain cases, nitrates. Particularly suitable alternative salts include other carboxylates, such as propionates, butyrates, isobutyrates, benzoates, haloacetates (such as mono-, di- and trichloroacetates and mono-, di- and trifluoroacetates), and the like. A preferred concentration of alkali metal salt is from 0.1M to 2.0M or higher, preferably from 0.2M to about 2.0M, and particularly preferably from 0.5M to about 1.0M.

Other solvents can be used in the incorporating step, such as lower alcohols (for example, methanol, ethanol, propanol, isopropanol, and butanol), N,N-dimethylformamide, mixtures thereof, and/or mixtures thereof with water, as long as the metal salt(s) are soluble in the solvent, and the solvent does not destroy the gel. Particularly preferred solvents are water, methanol and mixtures thereof.

The gel is allowed to remain in the metal salt solution for a period of time sufficient to allow the salts to diffuse to a desired extent in the gel. Preferably, the salts are allowed to diffuse uniformly throughout the gel. The diffusion is allowed to take place at a temperature of from 5° C. to 30° C., preferably from 15° to 30° C., particularly preferably about room temperature (20°14 27° C.), and for a time ranging from 5 hours to more than one week, preferably from 12 hours to one week, depending on the size and shape of the gel.

After incorporation into the gel matrix, the dopant metal salt(s) are precipitated within the pores of the host gel by immersing the doped gel in acetone, or another appropriate solvent in which the dopant salts have very low solubility, but which is sufficiently miscible with the solvent used in the metal salt solution to allow its diffusion into the gel. Acetone is the particularly preferred precipitation solvent, but other appropriate solvents can also be used, such as methyl ethyl ketone, alcohols of at least three carbon atoms (for example, propanol, isopropanol, butanol, isobutanol, t-butanol, pentanol and structural isomers thereof and hexanol and structural isomers thereof), and the like. The precipitation step prevents the dopant salts from migrating during drying, and permits incorporation of one or more high refractive index modifiers without use of an unstable or insoluble metal alkoxide.

The precipitate-containing gel is then optionally washed with acetone or other appropriate solvent used for precipitation, preferably the same solvent used for the precipitation. Typically, after washing, the precipitate-containing gel is then dried, optionally with heating, for an amount of time sufficient to remove the free liquid from within the gel. Preferably, drying is conducted at a temperature of from 50° C. to 100° C., for an amount of time preferably less than one week, and particularly preferably from 12 hours to two days. temperature of from 50° C. to 100° C., for an amount of time preferably less than one week, and particularly preferably from 12 hours to two days.

After drying, the impregnated gel is then converted to a glass by careful heating, thus resulting in a fully dense monolithic glass body. Preferably, heating comprises sintering at a temperature ranging from 200° C. to 1000° C., preferably from 300° C. to 900° C., keeping the temperature below the melting point of the glass. Particularly preferably, sintering is conducted by raising the temperature at a rate of 50° C./min or less, most particularly preferably at a rate of about 5° C./min or less, to a final sintering temperature less than the melting point of the glass.

Thus, the present invention refers to a process for the preparation of a monolithic multicomponent oxide glass, comprising (1) gelling a mixture of a silicon alkoxide, an alcohol, amounts of water and acid sufficient to partially hydrolyze the alkoxide, and optionally, at least one other alkoxide of a metal selected from the group consisting of Ti, Zr, Hf, Nb, Ta, B, Al, Ga, Ge, Sn and Sb, (2) incorporating into the gel at least one salt of at least one metal selected from the group consisting of Li, Na, K, Rb, Cs, Sc, Y, La, Ce, Pr, Nd, Sm, Eu, Gd, Tb, Dy, Ho, Er, Tm, Yb, Lu and Pb, (3) precipitating the metal salts incorporated into the gelled mixture, and (4) sintering the gelled mixture into which the metal salt has been precipitated. In an alternative embodiment, at least one salt of at least one high refractive index modifying metal selected from the group consisting of Li, Na, K, Rb, Cs, Sc, Y, La, Ce, Pr, Nd, Sm, Eu, Gd, Tb, Dy, Ho, Er, Tm, Yb, Lu and Pb, and at least one salt of at least one alkali metal of the group consisting of Li, Na, K, Rb and Cs is incorporated into the gel.

The amount of silica in the monolithic multicomponent oxide glass of the present invention is from 30 to 98 mole percent, preferably 50 to 95 mole percent, and particularly preferably 60 to 90 mole percent.

The amount of titania in the final glass can be up to 50 mole percent, but is preferably from 1 to 40 mole percent, particularly preferably 2 to 30 mole percent.

The amount of $Al_2O_3$ in the final glass should be between 0 and 30 mole percent, but is preferably from 1 to 30 mole percent, and is particularly preferably from 2 to 20 mole percent.

If present, the amount of lead oxide and/or lanthanide oxide(s) in the final glass should be from 1 to 40 mole percent, preferably from 3 to 30 mole percent, and particularly preferably from 5 to 25 mole percent.

The amount of alkali metal dopant, such as Li, Na, K, Rb or Cs, in the gel, should be between 0 and 30 mole percent, expressed as metal oxides. Preferably, the alkali metal is Na or K, and it is preferably present in the glass in an amount of from 0 to 25 percent, particularly preferably from 5 to 20 mole percent.

Other features of the invention will become apparent in the course of the following descriptions of exemplary embodiments which are given for illustration of the invention and are not intended to be limiting thereof.

EXAMPLE 1

A batch of host gels with a relative oxide composition of 20 mole % $TiO_2$, 5 mole % $Al_2O_3$, and 75 mole % $SiO_2$ are made by first mixing N,N-dimethylformamide (15.3 ml), methanol (15.3 ml), and tetramethyl orthosilicate (8.4 ml) in a teflon beaker, then adding 0.1M aqueous HCl (1.02 ml) and stirring for 10 minutes. Aluminum di(sec-butoxide) acetoacetic ester chelate (1.2 g) and titanium isopropoxide (4.5 ml) are combined in a test tube, and then quickly added to the mixture. The resulting solution is stirred for 10 minutes and then chilled to 0° C. Water (4.4 ml) is added to the cold solution, and this final mixture is stirred for 5 minutes before being poured into polypropylene molds. The volume of solution poured into each mold is 10 ml. The solution gels within about 30 minutes, and the gels are aged at room temperature for 1 day, and then for another day at 60° C. After cooling back down to room temperature, one of the gels is then removed from the polypropylene mold, and immersed in 50 ml of an aqueous 1.0M Pb acetate, and 0.8M Na acetate solution. After 3 days of immersion, the sample is transferred to an acetone bath, maintained in the bath for one to two days, then is removed from the acetone. The precipitate-containing gel is dried by placing it in a 25×200 mm test tube, and then heating the test tube at 70° C. in an oven equipped with a flowing air atmosphere. After drying for one day, the sample is sintered by heating to 250° C. at a rate of 5°/min in the flowing air atmosphere, then heating to 480° C. for 10 hours. The resulting glass sample is transparent and fully dense, and has a yellow color. Its index of refraction at the sodium-d wavelength is greater than 1.80.

EXAMPLE 2

A batch of host gels with a relative oxide composition of 5 mole % $TiO_2$, 10 mole % $Al_2O_3$, and 85 mole % $SiO_2$ are made by first mixing N,N-dimethylformamide (15.6 ml), methanol (15.6 ml), and tetramethyl orthosilicate (9.7 ml) in a teflon beaker, then adding 0.1M aqueous HCl (1.2 ml), and stirring for 10 minutes. In a test tube, aluminum di(sec-butoxide) acetoacetic ester chelate (2.3 g) and titanium isopropoxide (1.2 ml) are combined, then quickly added to the mixture. The resulting solution is stirred for 10 minutes, and then chilled to 0° C. To the cold solution, water (4.4 ml) is added, and this final mixture is stirred for 5 minutes before being poured into polypropylene molds. The volume of solution poured into each mold is 10 ml. The solution gels within about two hours, and the gels are aged at room temperature for 1 day, and then for another day at 60° C. After cooling back down to room temperature, one of the gels is then removed from its mold, and immersed in 50 ml of an aqueous 1.0M Pb acetate, 0.8M Na acetate solution. After 2 days of soaking, the sample is transferred to an acetone bath, maintained for about one day, then is removed from the acetone. The precipitate-containing gel is dried by placing it in a 25×200 mm test tube, and heating in an oven at 70° C. in a flowing air atmosphere. After drying for one day, the sample is sintered by heating in a flowing air atmosphere to 250° C. at a rate of 5° C. per minute, then raising the temperature to 480° C. at a rate of 0.5° per minute, and holding the temperature at 480° for 10 hours. The sample is then heated to 600° C. at a rate of 5° C. per minute in flowing He. The resulting glass sample is transparent and fully dense. Its index of refraction at the sodium-d wavelength is 1.675.

EXAMPLE 3

A host gel identical to the one used in example 2 is immersed in 60 ml of an aqueous 0.2M Er acetate, 0.8M Na acetate solution for 2 days with constant agitation. The doped gel is them immersed in 60 ml of acetone for one day. The gel is then dried in a manner identical to the one described in examples 1 and 2. The gel is sintered by heating to 500° C. at 0.5° per minute in flowing air, then to 780° C. at 5°/min in flowing He. The resulting glass sample has an intense pink color and has a refractive index of about 1.55.

EXAMPLE 4

A host gel identical to the one used in example 2 is immersed in 60 ml of an aqueous 0.2M Nd acetate, 0.8M Na acetate solution for 2 days with constant agitation. The doped gel is them immersed in 60 ml of acetone for one day. The gel is then dried in a manner identical to the one described in examples 1 and 2. The gel is sintered by heating to 500° C. at 0.5°/min in flowing air, then to 790° C. at 5°/min in flowing He. The resulting sample has a thin layer of opaque unsintered material surrounding dark blue/lavender glass.

EXAMPLE 5

A host gel identical to the one used in example 2 is immersed in 60 ml of an aqueous 0.2M La acetate, 0.8M K acetate solution for 2 days with constant agitation. The doped gel is then immersed in 60 ml of acetone for one day. The gel is then immersed in a second acetone bath for another day. The gel is then dried in a manner identical to the one described in examples 1 and 2. The gel is sintered by heating to 500° C. at 0.5°/min in flowing air, then to 790° C. at 5°/min in flowing He. The resulting sample has a thin layer of opaque unsintered material surrounding transparent, fully dense glass with a refractive index of 1.54.

EXAMPLE 6

A host gel identical to the one used in example 2 is immersed in 60 ml of an aqueous 0.2M Yb acetate, 0.8M K acetate solution for 5 days with constant agitation. The doped gel is them immersed in 60 ml of acetone for one day. The gel is then immersed in a second acetone bath for another day. The gel is then dried in a manner identical to the one described in examples 1 and 2. The gel is sintered by heating to 500° C. per minute in flowing air, then to 860° C. at 5°/min in flowing He. The resulting sample is completely colorless glass with no unsintered material on its surface.

EXAMPLE 7

An oxide gel containing 40 mole % $TiO_2$ and 60 mole % $SiO_2$ is made by first mixing 24.6 ml of methanol with 6.5 ml of tetramethyl orthosilicate and 0.78 ml of aqueous 0.1M HCl, and stirring for 10 minutes. Five ml of glacial acetic acid is then added, and the mixture is stirred for 10 minutes. Then, 8.62 ml of titanium isopropoxide is added and the resulting clear solution is stirred for 20 minutes. The solution is chilled to 0° C., then 4.5 ml of water is added. The resulting solution is stirred for 2 minutes, then is poured into polypropylene molds. The volume of solution in each mold is 10 ml. The solution gels in about 20 minutes, and the gels are then aged for 1 day at 25° C., and then for another day at 60° C. The gels are then cooled back to room temperature, and one of them is removed from its mold.

A 1.0M solution of sodium acetate is prepared by diluting aqueous 4.0M sodium acetate with an appropriate amount of methanol. The gel is immersed in 60 ml of the sodium acetate bath with agitation for two days, then transferred to 60 ml of pure acetone to precipitate the sodium acetate. After washing thoroughly in acetone, the gel is dried by placing it inside a 25×200 mm test tube and then placing the test tube inside an oven heated to about 70° C. After 2 days of drying, the gel is then sintered by heating from room temperature to 400° C. in flowing air at 0.3° C. per minute, then to 530° C. in flowing air at 2° C. per minute, and finally to 640° C. in flowing helium at 10° C. per minute. At this point, the gel has fully densified into transparent glass with a refractive index of 1.750 at the sodium d-line.

EXAMPLE 8

An oxide gel containing 50 mole % $TiO_2$ and 50 mole % $SiO_2$ is prepared by a process identical to that used to make the qels for Example 7, except the amounts of the materials used are 24.0 ml of methanol, 5.4 ml of tetramethyl orthosilicate, 0.64 ml of 0.1M HCl, 5 ml of glacial acetic acid, 10.64 ml of titanium isopropoxide, and 4.5 ml of water. The resulting gel is then processed in the same manner as in Example 7, and the result is a transparent glass with a refractive index of 1.83 at the sodium d-line.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of United States is:

1. A method for the preparation of a monolithic multicomponent oxide glass, comprising the steps of:
   (a) gelling a mixture comprising a silicon alkoxide, a titanium alkoxide, an alcohol, and an amount of water and acid sufficient to partially hydrolyze the silicon alkoxide, to obtain a gel, wherein said silicon alkoxide is present in an amount sufficient to result in said glass containing from 30 to 98 mole percent of silica;
   (b) diffusing uniformly into said gel a solution of at least one salt of at least one alkali metal selected from the group consisting of Li, Na, K, Rb, Cs and mixtures thereof in an amount sufficient to result in said glass containing from 5 to 30 mole percent of an oxide of said alkali metal;
   (c) precipitating said uniformly diffused alkali metal salt in said gel to obtain a gelled mixture; and
   (d) sintering said gelled mixture.

2. The method of claim 1, wherein said solution of said diffusing step further comprises at least one salt of at least one high refractive index modifying metal selected from the group consisting of Sc, Y, La, Ce, Pr, Nd, Sm, Eu, Gd, Tb, Dy, Ho, Er, Tm, Yb, Lu and Pb.

3. The method of claim 1, wherein said gelling is conducted at a temperature of from 5° C. to 30° C.

4. The method of claim 1, further comprising the step of aging said gel at a temperature of from 20° C. to 100° C. before said diffusing step.

5. The method of claim 1, wherein said diffusing of a solution of said salt into said gel is conducted at a temperature of from 5° C. to 30° C.

6. The method of claim 5, wherein said solution is aqueous.

7. The method of claim 1, further comprising the step of drying said gelled mixture at a temperature of from 50° C. to 100° C. prior to said sintering step.

8. The method of claim 1, wherein said sintering is conducted at a temperature of from 200° C. to 1000° C.

9. The method of claim 1, wherein said sintering is conducted at a temperature less than the melting point of said monolithic multicomponent oxide glass.

10. The method of claim 1, wherein in said gelling step said mixture further comprises at least one alkoxide of at least one metal selected from the group consisting of Zr, Hf, Nb, Ta, B, Al, Ga, Ge, Sn, Sb and mixtures thereof.

11. The method of claim 10, further comprising partially hydrolyzing said silicon alkoxide, then adding said titanium alkoxide and said alkoxide of a metal selected from the group consisting of Zr, Hf, Nb, Ta, B, Al, Ga, Ge, Sn, Sb and mixtures thereof prior to said gelling.

12. The method of claim 1, wherein in said gelling step said mixture further comprises an alkoxide of aluminum.

13. The method of claim 1, wherein said gelling is conducted by adding a second portion of water to said mixture to result in a gel sufficiently strong to withstand subsequent processing steps.

14. The method of claim 1, further comprising the step of aging the gelled mixture for a period of time of from 10 minutes to one week after said gelling step and prior to said diffusing step.

15. The method of claim 9, wherein said sintering is conducted at a temperature sufficiently high and for a length of time sufficiently long to form a dense glass.

16. The method of claim 2, wherein said salt of said high refractive index modifying metal is present in an amount sufficient to result in said glass containing from 1 to 40 mole percent of an oxide of said high refractive index modifying metal.

17. The method of claim 1, wherein said salt of said alkali metal is present in an amount sufficient to result in said glass containing from 5 to 20 mole percent of an oxide of said alkali metal.

18. The method of claim 1, wherein said alkoxide of titanium is present in an amount sufficient to result in said glass containing up to 50 mole percent of an oxide of said titanium.

19. The method of claim 18, wherein said alkoxide of titanium is present in an amount sufficient to result in said glass containing from 1 to 40 mole percent of an oxide of said titanium.

20. The method of claim 18, wherein said mixture of said gelling step further comprises an alkoxide of aluminum in an amount sufficient to result in said glass containing up to 30 mole percent of an oxide of said aluminum.

21. The method of claim 19, wherein said alkoxide of aluminum is present in an amount sufficient to result in said glass containing from 1 to 30 mole percent of an oxide of said aluminum.

22. A method for the preparation of a monolithic multicomponent oxide glass, comprising the steps of:
(a) gelling a mixture comprising a silicon alkoxide, an alkoxide of titanium, an alcohol, and an amount of water and acid sufficient to partially hydrolyze the silicon alkoxide, to obtain a gel, wherein said silicon alkoxide is present in an amount sufficient to result in said glass containing from 30 to 98 mole percent of silica, and said alkoxide of titanium is present in an amount sufficient to result in said glass containing from 1 to 40 mole percent of an oxide of said titanium;
(b) diffusing uniformly into said gel a solution of at least one salt of at least one high refractive index modifying metal selected from the group consisting of Sc, Y, La, Ce, Pr, Nd, Sm, Eu, Gd, Tb, Dy, Ho, Er, Tm, Yb, Lu, Pb and mixtures thereof in an amount sufficient to result in said glass containing from 1 to 40 mole percent of an oxide of said high refractive index modifying metal;
(c) precipitating said high refractive index modifying metal salt in said gel to obtain a gelled mixture; and
(d) sintering said gelled mixture.

23. The method of claim 22, wherein said solution of said diffusing step further comprises at least one salt of at least one alkali metal selected from the group consisting of Li, Na, K, Rb, Cs and mixtures thereof in an amount sufficient to result in said glass containing from 5 to 30 mole percent of an oxide of said alkali metal.

24. The method of claim 22, wherein said mixture of said gelling step further comprises an alkoxide of aluminum in a amount sufficient to result in said glass containing up to 30 mole percent of an oxide of said aluminum.

25. The method of claim 22, further comprising an alkoxide of aluminum present in an amount sufficient to result in said glass containing from 1 to 30 percent of an oxide of said aluminum.

26. The method of claim 22, wherein said high refractive index modifying metal in said diffusing step is lead.

27. The method of claim 23, wherein said high refractive index modifying metal in said diffusing step is lead.

* * * * *